Dec. 26, 1950  B. W. SMITH  2,535,326
PROJECTION VIBRATION INDICATOR
Filed Oct. 14, 1948
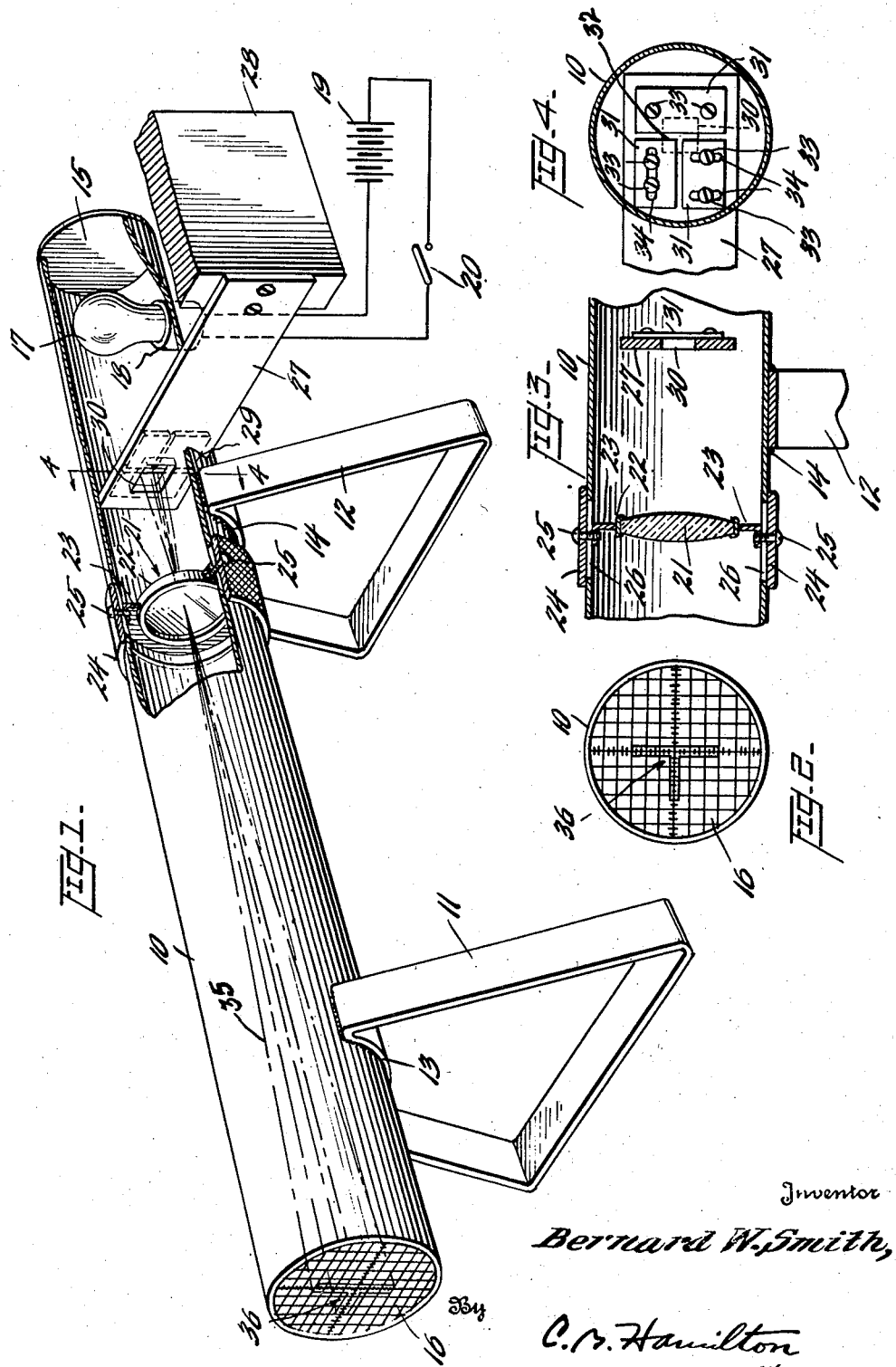
Inventor
Bernard W. Smith,
By
C. B. Hamilton
Attorney Patented Dec. 26, 1950

2,535,326

UNITED STATES PATENT OFFICE 2,535,326

PROJECTION VIBRATION INDICATOR

Bernard William Smith, Winston-Salem, N. C., assignor to Western Electric Company, Incorporated, New York, N. Y., a corporation of New York Application October 14, 1948, Serial No. 54,547

12 Claims. (Cl. 88—24)

This invention relates to instruments for measuring the vibration of objects and more particularly to the simultaneous optical measurement of the amplitude of vibration of mechanical parts in two perpendicular planes.

In various manufacturing operations, it is often desirable to measure the vibration of machinery. Such determinations may be made more conveniently and efficiently by simultaneously measuring the horizontal and vertical amplitude of vibration.

An object of the invention is to provide a portable apparatus of simple construction and easy adjustment for the accurate optical measurement of the horizontal and/or vertical amplitude of vibration of a unit to be tested.

With the above and other objects in view, the invention may be embodied in a testing device comprising a container having a single light source before which an actuated arm may vibrate and cause an image to be projected upon a viewing screen which is calibrated both horizontally and vertically.

Other objects and features of the invention will appear from the following detailed description of one embodiment thereof, taken in conjunction with the accompanying drawing in which the same reference numerals are applied to identical parts in the several figures and, in which Fig. 1 is a perspective view of one embodiment of the invention in operating position with sections cut away to show details of the construction and operation.

Fig. 2 is a front or end elevational view of the calibrated viewing screen.

Fig. 3 is a fragmentary sectional view of the tube of Fig. 1 showing the means for adjusting the viewing lens.

Fig. 4 is a sectional view of Fig. 1 taken on the line 4—4 looking in the direction of the arrows, to show the mechanism of the adjustable slots located at one end of the vibrating arm.

In the embodiment of the invention herein disclosed, a stationary container in the form of an elongated tube 10 is secured to a pair of supporting legs 11 and 12 by welds 13 and 14. One end of the tube 10 is closed by a removable cover 15 and the other end of the tube 10 is closed by a calibrated viewing screen 16. An electric light or lamp 17 is positioned within the tube 10 near the closure 15 and is seated in a socket 18, which socket is connected to a source of electric current shown schematically as a battery 19 having a control switch 20. A focusing lens 21 is interposed between the light source 17 and the viewing screen 16, and is adaptable for adjustment longitudinally of the tube 10.

The lens 21 may be made secure and adjustable within the tube 10 by any suitable means. In the embodiment shown, the lens 21 is held by a retaining ring 22 which is secured to a circular flange 23, which in turn is secured to a sleeve 24 by a plurality of bolts 25. The adjustment of the sleeve 24 along the tube 10 is limited by the movement of the bolts 25 in a plurality of slots 26 in the tube 10.

A vibration actuated arm 27 is secured at one end to an object 28 to be tested for vibration, the other end of the arm 27 enters the tube 10 through a slot 29 with ample clearance and is interposed between the light source 17 and the viewing screen 16. The interposing end of the arm 27 is provided with a rectangular opening 30 which is partially covered by a plurality of adjustable flat plates 31 to provide a resulting T-shaped aperture 32 for the passage of a beam of light 35. The plates 31 are secured to the end of the arm 27 by a plurality of machine screws 33 and are limited in their adjustment by the movement of the screws 33 in a plurality of slots 34 in the plates 31.

The viewing screen 16 may be composed of a transparent or translucent material, an opal glass is particularly suitable, and it may be calibrated in any manner appropriate for horizontal and vertical measurement of an image. One method of calibration is illustrated in Fig. 2 in which an enlarged light image 36 of the T-shaped slot 32 is centered on the screen 16 while the arm 27 is not vibrating.

In the operation of the device, one end of the arm 27 is secured to the unit of machinery 28 to be tested. The opposite end of the arm 27 is inserted through the slot 29 in the tube 10 and interposed between the source of light 17 and the calibrated viewing screen 16. The flat plates 31 are adjusted to control the size of the T-shaped slot 32 which partially covers the opening 30 in the interposed end of the arm 27 permitting the passage of the beam of light 35. The adjustable lens 21 is used to focus the enlarged image 36 of the T-shaped slot 32 upon the calibrated viewing screen 16. The amplitude of vibration of the machinery unit 28 may then be measured in two directions in terms of the movement of the image 36 over the calibration marks on the viewing screen 16.

It is to be understood that the above-described arrangement is simply illustrative of the application of the principles of the invention. Numerous other arrangements may be readily devised by those skilled in the art which will embody the principles of the invention and fall within the spirit and scope thereof.

What is claimed is:

1. In a vibration testing apparatus, a light source, a viewing screen, a movable member having one end adapted to contact and vibrate with a unit to be tested, the other end of said member having an aperture adapted to be interposed and vibrate between the light source and the viewing screen, and means for projecting an image of said aperture upon said screen whereby a movement of the unit being tested will be transmitted through the vibrating aperture into a movement of an image of the aperture upon the viewing screen.

2. In a vibration testing apparatus, a stationary container, a source of light located within the container, a viewing screen positioned on the container, said viewing screen having calibration marks for a plurality of directions, a movable member having one end adapted to contact and vibrate with a unit to be tested, the other end of said member having a slit positioned between the light source and the screen, and means to project an image upon the viewing screen to indicate vibration in a plurality of directions in response to any movement of said unit.

3. In a vibration testing apparatus, a stationary container, a source of light located within the container, a viewing screen positioned on the container, said screen having calibration lines for two directions, a movable member having one end adapted to contact and vibrate with a unit to be tested, the other end of said member having a slit, means on said apparatus to project an image of said slit upon the viewing screen to indicate vibration in two directions in response to any movement of said unit being tested, and said means including an adjustable lens adapted to focus the image of the slit upon said screen.

4. In a vibration testing apparatus, a stationary container, a source of light located within the container, a viewing screen positioned on the container, said viewing screen having calibration marks for two directions at right angles to each other, a movable member adapted to contact and vibrate with a unit to be tested and to enter a section of the container and be interposed between the light source and the viewing screen, said interposed member having a slit for passage of the light beam, and means for projecting an image of said slit upon said screen whereby any movement of said unit in two directions will be registered by movement of an image of the slit upon the calibration marks of the viewing screen.

5. In a vibration testing apparatus, a stationary container, a source of light located within the container, a viewing screen positioned on the container, said viewing screen having calibration marks for two directions at right angles to each other, a movable member adapted to contact and vibrate with a unit to be tested and to enter a section of the container and be interposed between the light source and the viewing screen, said interposed member having a slit for passage of the light beam, means for projecting an image of said slit upon said screen whereby any movement of said unit in two directions will be registered by movement of an image of the slit upon the calibration marks of the viewing screen, and said means including an adjustable lens adapted to focus the image upon the screen.

6. In a vibration testing apparatus, a stationary container, a source of light located within the container, a viewing screen positioned on the container, a movable member adapted to contact and vibrate with a unit to be tested and to enter a section of the container and be interposed between the light source and the viewing screen, said interposed member having a plurality of slits for the passage of the light beam, and means for projecting an image of said slits upon said screen whereby any movement of said unit in two directions will be registered by movement of an image of the slits upon the viewing screen.

7. In a vibration testing apparatus, a stationary container, a source of light located within the container, a viewing screen positioned on the container, a movable member having one end adapted to contact and vibrate with a unit to be tested, the other end of said member adapted to enter a section of the container and be interposed between the light source and the viewing screen, said interposed end having two adjustable slits perpendicular to each other for passage of the light beam, and means for projecting an image of said slits upon said screen whereby any movement of said unit in two directions will be registered by movement of an image of the slits upon the viewing screen.

8. In a vibration testing apparatus, a stationary portable container, a source of light located within the container, a viewing screen positioned on the container, a movable member having one end adapted to contact a unit to be tested and another end arranged to enter a section of the container and be interposed between the light source and the viewing screen, said interposed end having an adjustable aperture for passage of the light, and an adjustable lens to focus an image of the aperture upon the viewing screen whereby a movement of the unit being tested will be transmitted into a movement of the image of the aperture upon the viewing screen.

9. In a vibration testing apparatus, a stationary container, a source of light located within the container, a viewing screen positioned on the container, a movable member having one end adapted to contact a unit to be tested and another end arranged to enter a section of the container and be interposed between the light source and the viewing screen, said interposed end having a plurality of slits for the passage of the light, adjustable means for controlling the aperture of the slits, and an adjustable lens to focus an image of the slits upon the viewing screen whereby a movement of the unit being tested will be transmitted into a movement of the image of the slits upon the viewing screen.

10. In a vibration testing apparatus, a stationary portable container, a source of light located within the container at one end thereof, a viewing screen positioned on the opposite end of the container, said viewing screen having a set of calibration marks for two directions, a movable arm having one end adapted to contact a unit to be tested and having the other end arranged to enter a section of the container and be interposed between the light source and the viewing screen, said interposed end having two slits perpendicular to each other for passage of the light, a plurality of adjustable plates arranged to control the aperture of the slits, and an adjustable lens to focus an image of the slits upon the viewing screen whereby a vibration in two directions of the unit being tested may be measured in terms of a movement of the image upon the calibration marks of the viewing screen.

11. In a vibration testing apparatus, a light source, a viewing screen having calibration marks for two directions at right angles to each other, a movable member having one end adapted to contact and vibrate with a unit to be tested, the other end of said member having a T-shaped slit adapted to be interposed and vibrate between the light source and the viewing screen, and means for projecting an image of said T-shaped slit upon said screen whereby vibrations of said unit will be registered on the viewing screen in the calibrated directions by movement of an image of the T-shaped slit.

12. In an apparatus for measuring the amplitude of vibration of bodies, a light source, a viewing screen, means for projecting an image upon said screen, a movable member having one end in contact with a vibrating body, the other end of said member having a predetermined configuration interposed between the light source and the projection means for projecting an image of said configuration upon the viewing screen, whereby movement of the body being tested will be transmitted through the vibrating configuration into a movement of an image of the said configuration upon the said viewing screen.

BERNARD WILLIAM SMITH.

REFERENCES CITED

The following references are of record in the file of this patent:

UNITED STATES PATENTS

| Number | Name | Date |
|---|---|---|
| 975,949 | Henwood | Nov. 15, 1910 |
| 1,518,786 | Griswold | Dec. 9, 1924 |
| 1,552,982 | Brader | Sept. 8, 1925 |
| 1,908,990 | Ledig | May 16, 1933 |
| 1,949,603 | Davey | Mar. 6, 1934 |
| 2,131,738 | Hoyt | Oct. 4, 1938 |
| 2,388,912 | Haferl et al. | Nov. 13, 1945 |